United States Patent
Chandrasekaran et al.

(10) Patent No.: US 10,387,641 B2
(45) Date of Patent: Aug. 20, 2019

(54) SECURE MULTIPLE-PARTY COMMUNICATION AND DATA ORCHESTRATION

(71) Applicant: Bank of America Corporation, Charlotte, NC (US)

(72) Inventors: Vignesh Chandrasekaran, Chennai (IN); Amit Mishra, Chennai (IN); Anupreet Kaur Lamba, Gurgaon (IN); Yugal Malviya, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/619,712

(22) Filed: Jun. 12, 2017

(65) Prior Publication Data

US 2018/0357410 A1 Dec. 13, 2018

(51) Int. Cl.
| | |
|---|---|
| G06F 21/44 | (2013.01) |
| G06F 21/32 | (2013.01) |
| G06F 21/62 | (2013.01) |
| H04L 29/06 | (2006.01) |

(52) U.S. Cl.
CPC .......... *G06F 21/445* (2013.01); *G06F 21/32* (2013.01); *G06F 21/6245* (2013.01); *H04L 63/0861* (2013.01); *H04L 63/0869* (2013.01); *H04L 63/104* (2013.01); *H04L 29/06816* (2013.01)

(58) Field of Classification Search
CPC ... G06F 21/445; G06F 21/32; H04L 29/06816
See application file for complete search history.

(56) References Cited

U.S. PATENT DOCUMENTS

| | | | |
|---|---|---|---|
| 5,987,606 A | 11/1999 | Cirasole et al. | |
| 7,076,558 B1 | 7/2006 | Dunn | |
| 7,454,508 B2 | 11/2008 | Matthew et al. | |
| 7,571,466 B2 | 8/2009 | Mitchell et al. | |
| 8,788,582 B2 | 7/2014 | Heiss et al. | |
| 9,536,107 B2 | 1/2017 | Soman et al. | |
| 2006/0165106 A1* | 7/2006 | Nishiki | H04L 12/1886 370/401 |
| 2006/0282371 A1* | 12/2006 | Doyle | G06Q 40/02 705/38 |
| 2007/0226129 A1* | 9/2007 | Liao | G06Q 20/10 705/38 |
| 2008/0015954 A1* | 1/2008 | Huber | G06Q 10/087 705/28 |
| 2013/0117647 A1* | 5/2013 | WeissMalik | G06Q 10/10 715/205 |

* cited by examiner

*Primary Examiner* — Thomas D Alunkal
(74) *Attorney, Agent, or Firm* — Weiss & Arons LLP; Michael A. Springs, Esq.

(57) ABSTRACT

Apparatus and methods may enable a primary to add a co-applicant via phone number to initiate a three-way communication. The primary applicant and the co-applicant can submit their confidential content along with other inputs from their own device after biometric authentication. Consent to submit a final application can be taken separately from each applicant through biometric capabilities on their own personal devices. A chat-bot may orchestrate and collect information for application fulfillment in parallel from both the applicants. Confidential content of one applicant, such as a social security number, may be kept hidden from disclosure to a co-applicant. Interaction among applicants may be across one or more communication channels.

16 Claims, 6 Drawing Sheets

SECURE MULTIPLE-PARTY COMMUNICATION AND DATA ORCHESTRATION

FIELD OF TECHNOLOGY

This disclosure relates to technical improvements to performance and security provided by a data orchestration system.

BACKGROUND

A customer may wish to obtain a service or product that requires confidential content. For example, opening or closing a bank account or credit card may require the customer to provide a social security number, birth date or annual income. The customer may wish to apply and use the service or product jointly with a co-applicant. For example, a co-applicant may be a spouse, child or friend.

Typically, to jointly apply and obtain the product or service (collectively hereinafter, "product"), the customer may complete an application for the product. The customer may first enter confidential content requested as part of the application process. Subsequently, the co-applicant may be forwarded a copy of the application. The co-applicant may access the application and also enter confidential content.

When the co-applicant accesses the application, confidential content entered by the customer may be exposed to the co-applicant. After the co-applicant completes the application, the application may be forwarded to the customer for verification. When the customer accesses the application, confidential content entered by the co-applicant may be exposed to the customer. Thus, a typical procedure for jointly obtaining a product or service may include undesirable exposure of confidential content.

The typical procedure for jointly obtaining a product or service may require that the application is completed sequentially by the customer and co-applicant. If either party delays completion of their requested information, the entire application process may be terminated for both parties.

For example, when electronically completing the application, if the applicant does not sign the application within a pre-determined time period after the co-applicant completes the application, the application may "time out." After the application times out, the applicant and co-applicant may be required to start the application process over from the beginning.

It would be desirable to provide technical improvements that reduce exposure of confidential content. It would also be desirable to provide technical improvements for asynchronous completion of a joint application for a product.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Apparatus and methods for secure multiple-party communication and data orchestration are provided. Methods may include providing asynchronous and restricted access to confidential content. The confidential content may be transmitted from a secure storage location to an unverified co-applicant device. A user of the co-applicant device may not be verified. A level of data security associated with the co-applicant device may be unverified.

Methods may include, using a secure device, initiating a secure connection to a data orchestration system. The secure device may have been previously verified as being associated with a known person or a known level of data security. The secure device may be operated by a primary applicant that initiates an application for a product on behalf of one or more co-applicants.

The data orchestration system may include a non-transitory machine readable memory. The non-transitory memory may store computer executable instructions. The data orchestration system may include a processor configured to execute the computer executable instructions. For example, a processor circuit may be embedded in an integrated circuit board of the data orchestration system. The processor may control overall operation of the data orchestration system and its associated components.

The data orchestration system may include RAM, ROM, an input/output ("I/O") module and a non-transitory or non-volatile memory. The I/O module may include a microphone, button and/or touch screen which may accept user provided input. The I/O module may include one or more of a speaker for providing audio output and a display for providing textual, audiovisual and/or graphical output.

Computer executable instructions such as software applications may be stored within the non-transitory memory and/or other storage media. The software may provide instructions to the processor that enable the data orchestration system to perform various functions. For example, the non-transitory memory may store software used by the data orchestration system, such as an operating system, application programs, web browser and a database. Alternatively, some or all of computer executable instructions of the data orchestration system may be embodied in hardware or firmware components of the system.

Software application programs, which may be used by the data orchestration system, may include computer executable instructions for invoking user functionality related to communication, such as email, short message service ("SMS"), and voice input and speech recognition applications. Application programs may utilize one or more algorithms that analyze computational loads processed by the data orchestration system, computational loads processed devices that access the data orchestration system, filter confidential content or any other suitable tasks.

The data orchestration system may operate in a networked environment. For example, the data orchestration system may support network connections to other systems within the complex web and patch servers storing software patches. The data orchestration system may support establishing network connections to one or more remote computers. Such remote computers may be nodes on a network. The nodes may be personal computers or servers that include many or all of the elements described above relative to the data orchestration system.

The network connections may include a local area network ("LAN") and a wide area network ("WAN"), and may also include other networks. When used in a LAN networking environment, the data orchestration system may be connected to the LAN through a network interface or adapter. The communication circuit may include the network interface or adapter.

When used in a WAN networking environment, the data orchestration system may include a modem or other means for establishing communications over a WAN, such as the Internet. It will be appreciated that the existence of any of various well-known protocols such as TCP/IP, Ethernet, FTP, HTTP and the like is presumed, and the data orchestration system can be operated in a client-server configuration to permit a user to retrieve web pages from a web-based server. Web browsers can be used to display and manipulate data on web pages.

The data orchestration system and network nodes may include various other components, such as a battery, a speaker, and antennas (not shown). For example, network nodes may be portable devices such as a laptop, a tablet, chat-bot, a smartphone or any other suitable device for receiving, storing, transmitting and/or displaying relevant information.

The data orchestration system may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The data orchestration system may utilize computer-executable instructions, such as program modules, executed by a computer. Generally, program modules include routines, programs, objects, components, data structures, etc. that perform particular tasks or implement particular data types. The data orchestration system may be operational with distributed computing environments where tasks are performed by remote processing devices that are linked through a communications network. In a distributed computing environment, program modules may be located in both local and remote computer storage media including memory storage devices.

A device that accesses the data orchestration system that may include one or more features of the data orchestration system. For example, an accessing device may be a smart phone, desktop computer or other device. The accessing device may be operated by an applicant for a product. For example, an applicant may use the accessing device to initiate a request for a product that requires the submission of confidential content. An applicant that initiates a request for a product may be the "primary applicant."

After establishing a secure connection to the data orchestration system, methods may include using the secure device to transmit data to the data orchestration system. The data may include a first set of confidential content. Methods may include, receiving, at the data orchestration system, the first set of confidential content transmitted by the secure device.

A set of confidential content may include one or more instances of confidential content. Exemplary instances of confidential content may include:

Legal name;
Address;
Bank account information;
Credit history;
Social security number;
Birth date;
Co-applicant name;
Co-applicant destination address;
Mother's maiden name (or other personal information) and/or
Annual income.

A set of confidential content may include any suitable confidential information. For example, the first set of confidential content may include a destination address of an unverified co-applicant device. A primary applicant may expect the unverified device to be in possession of a desired co-applicant.

Based on the first set of confidential content received from the secure device, methods may include generating a first filtering scheme for the secure device. Based on the first set of the confidential content received from the secure device, methods may include generating a second filtering scheme for the co-applicant device.

A filtering scheme may control release of confidential content to a primary applicant or co-applicant. For example, a filtering scheme may redact specific instances of confidential content from a set of confidential content. A filtering scheme may require different levels of authentication to access specific instances of confidential content.

In some embodiments, three or more co-applicants may jointly apply for a product. A primary applicant may invite a two or more applicants to join the application procedure. A second applicant may invite a third applicant. A filtering scheme may control release and regulate access of confidential content to each applicant.

The data orchestration system may dynamically collect the information required for the application fulfillment in parallel from two or more applicants. For example, the data orchestration system may prompt a co-applicant for specific information based on prior inputs received from a primary applicant. The data orchestration system may dynamically prompt an applicant for authentication before accepting information from the applicant. The data orchestration system may control access to confidential content.

Methods may include using the data orchestration system, initiating an unsecure communication over the unsecure network with an unverified co-applicant device using the destination address provided by the primary applicant. For example, the destination address may be a mobile phone number, email address or IP address associated with the unverified device.

Methods may include verifying the co-applicant device. Methods may include coordinating secure and asynchronous access via the verified co-applicant device to the data orchestration system. For example, the data orchestration system may send a text message to the co-applicant device that includes a link to download a mobile application. When the mobile application is installed on the co-applicant device, the co-applicant device may be configured to initiate a secure connection to the data orchestration system.

The mobile application may also conduct a security check based on information stored on the co-applicant device. For example, if the primary applicant identified the co-applicant device based on phone number, the mobile applicant may attempt to corroborate the phone number. The mobile application may examine a call log, text messages, or other data fields stored on the co-applicant device that may corroborate the phone number.

The second filtering scheme may include computer executable instructions for verifying the co-applicant device. For example, the second filtering scheme may authenticate the co-applicant device. Authenticating the co-applicant device may include creating a biometric profile for the co-applicant. The co-applicant may provide a biometric feature that will be used to gain access to the data orchestration system and/or confidential content stored thereon. Biometric features may include facial recognition, voice recognition, a fingerprint scan or any suitable biometric feature. The first filtering scheme may create such a biometric profile for the primary applicant.

Creating a biometric profile may obviate a need to capture "final consent" after a primary or co-applicant completes the application process. The applicant may be required to be authenticated each time they access the data orchestration system. Thus, data submitted to the data orchestration system may be pre-authenticated.

Asynchronous access may include allowing the co-applicant device to access the data orchestration system independently of the primary applicant. For example, the primary applicant and co-applicant devices may access the data orchestration system at different times and/or from different locations. The co-applicant device may access one or more instances of the first set of confidential content entered by primary applicant. Asynchronous access may include allowing and/or prompting the co-applicant to access the data orchestration system and enter a second set of confidential content independently of the primary applicant.

Based on coordinating secure and asynchronous access to the data orchestration system, methods may include deploying a third filtering scheme. The third filtering scheme may coordinate asynchronous access, for the primary applicant, to a third set of confidential content. The third set of confidential content may include the first set of confidential content (entered by the primary applicant) and a subset of the second set of confidential content (entered by the co-applicant). For example, the primary applicant may not be permitted to access a co-applicant's social security number.

Methods may include deploying a fourth filtering scheme. The fourth filtering scheme may coordinate secure and asynchronous access for the co-applicant, to a fourth set of confidential content. The fourth set of confidential content may include the second set of confidential content (entered by the co-applicant) and a subset of the first set of confidential content (entered by the primary applicant).

Using the fourth filtering scheme, the data orchestration system may asynchronously communicate with a co-applicant's device as a second secure device.

The data orchestration system may allow the primary applicant and co-applicant to access instances of confidential content in parallel. The data orchestration system may allow the primary applicant and the co-applicant to submit confidential content in parallel.

Methods may include creating the fourth filtering scheme associated with the co-applicant based on biometric authentication by the co-applicant. For example, the co-applicant may be allowed to a greater number of instances of the first set of confidential content after biometric authentication than before authentication.

Methods may include using a first communication channel for secure and asynchronous communication between the data orchestration system and the primary applicant. Methods may include using a second communication channel for secure and asynchronous communication between the data orchestration system and the co-applicant.

Illustrative communication channels may include an interactive voice channel, a text-based channel, a video chat channel and/or any suitable communication channel. Illustrative communication channels may include a combination of communication channels. For example, the data orchestration system may initiate a text based chat with the primary applicant. In parallel with the ongoing text chat, the data orchestration system may pose security questions to the primary applicant over voice based channel. The primary applicant may respond to the voice queries verbally, or may respond using the text based channel.

Apparatus may include system architecture for providing asynchronous and restricted access to confidential content. Using the system architecture, confidential content may be transmitted from a secure storage location to an unsecure device that requests the confidential content over an unsecure computer network.

The system architecture may include a data orchestration system. The system architecture may include a secure device. The secure device may have been previously authenticated by the data orchestration system. The secure device may initiate a secure connection to the data orchestration system.

The system architecture may include an unsecure device. The unsecure device may be invited to access the data orchestration system by the secure device.

After establishing a secure connection to the secure device, the secure device may receive and transmit a first set of confidential content to the data orchestration system. The first set of confidential content may include a destination address of the unsecure device.

Based on the first set of confidential content received from the secure device, the data orchestration system may associate a first filtering scheme with the secure device. The first filtering scheme, when applied to the secure device by the data orchestration subsystem, may coordinate asynchronous access to the first set of confidential content.

For example, when the secure device accesses the data orchestration system, the first filtering scheme may allow the secure device to access all instances of confidential content included in the first set of confidential content. The data orchestration system may identify and/or authenticate the secure device using any suitable authentication method.

Illustrative authentication methods may include biometric authentication and/or a username/password. Authentication may include a plurality of "soft" factors. Soft factors may include location of a device, grammar and spelling of responses provided by the device, a manufacturer of the device, unsecure or secure data stored on the device, application installed on the device, and/or settings of the device. Settings of the device may include ring tone(s), wallpaper, and/or restrictions associated with the device.

In some embodiments, the secure device may be authenticated based on a unique identifier stored within a mobile application installed and/or running on the secure device. The mobile application may establish a secure communication link between the secure device and the data orchestration system.

In some embodiments, the data orchestration system may initiate a secure communication over the unsecure network with a co-applicant device. For example, based on the destination address provided by the primary applicant, the data orchestration system may determine that the co-applicant device has been previously authenticated.

In some embodiments, the data orchestration system may initiate an unsecure communication over the unsecure network with a co-applicant device. The data orchestration system may locate the co-applicant device based on the destination address provided by the primary applicant. The unsecure communication may include transmitting to the co-applicant device computer executable instructions. The computer executable instructions may establish a secure connection from the co-applicant device to the data orchestration subsystem. For example, the computer executable instructions may trigger installation, on the co-applicant device, of a mobile application.

Once installed on the unsecure device, the mobile application may be used to initiate a secure connection between the co-applicant device and the data orchestration system. The computer executable instructions may assign a default login profile to the co-applicant device. The co-applicant device may use the default login to access the data orchestration system. The default login may be associated with a filtering scheme that restricts confidential content that may be accessed by the co-applicant.

When the co-applicant accesses the data orchestration system, the co-applicant (and co-applicant's associated device) may be authenticated by the data orchestration system. Authenticating the co-applicant device may include associating the co-applicant device with a biometric signature, username/password or any suitable authentication method or combination of authentication methods.

After authenticating the co-applicant, the data orchestration system may receive a request, from the co-applicant to initiate a secure connection. In response to the request, the data orchestration system may apply a second filtering scheme to the co-applicant device. The second filtering scheme, may allow the co-applicant device to submit a second set of confidential content to the data orchestration system. The second filtering scheme may coordinate asynchronous access, by the co-applicant device to the second set of confidential content.

Coordinating access may include, based on confidential content received from the secure device, responsively prompting the co-applicant for additional confidential content. Coordinating access may include allowing the secure (e.g., primary applicant) and co-applicant to access the data orchestration system in parallel. When the primary and co-applicant access the data orchestration system in parallel, the data orchestration system may dynamically prompt each applicant for information based on inputs received from the other applicant.

Coordinating access may include allowing the co-applicant to proceed with an application for a product without waiting to receive input from the primary applicant. Coordinating access may include allowing the primary applicant to proceed with an application for a product without waiting to receive input from the co-applicant.

Based on applying the first and second filtering schemes, the data orchestration system may receive the first and second set of confidential content in parallel from the primary and co-applicant devices.

Receiving confidential information in parallel via asynchronous access may prevent the data orchestration subsystem from timing out while communicating with the primary and/or co-applicant devices. For example, the data orchestration system may receive information from the co-applicant device without waiting for input from the secure device.

In some embodiments, the data orchestration system may initiate communication with a co-applicant device in response to receiving one or more inputs from the primary applicant. For example, the data orchestration may prompt the co-applicant for information needed to complete an application for a product. The data orchestration system may then present a subset of the information entered by the co-applicant device to the primary applicant.

The data orchestration system may allow each applicant to independently enter information required by the application process. The data orchestration system may allow each applicant to independently complete the application process and independently consent to jointly apply for the product.

In response to receiving requested information from the co-applicant, the data orchestration system may prompt the primary applicant for final consent to apply for the product. In response to receiving final consent from the primary applicant, the data orchestration system may initiate a communication with the co-applicant requesting the co-applicant's final consent to jointly apply for the product.

Multiple filtering schemes may be deployed by the data orchestration system during the application process. Each filtering scheme may control access to confidential content entered during the application process. The filtering schemes may prevent the disclosure of confidential content to an unauthorized party.

For example, a first filtering scheme may filter the second set of confidential content received from the co-applicant. The first filtering scheme may provide the primary applicant asynchronous access to a subset of the second set of confidential content.

The data orchestration system may deploy a second filtering scheme. The second filtering scheme may filter the first set of confidential content received from the primary applicant. The second filtering scheme may provide the co-applicant asynchronous access to a subset of the first set of confidential content.

In some embodiments, the second filtering scheme may deny the co-applicant access to the first set of confidential content received from the primary applicant.

In some embodiments, the second filtering scheme may terminate access of the co-applicant to the data orchestration system. For example, before granting the co-applicant access to the data orchestration system or confidential content stored on the data orchestration system, the data orchestration system may attempt to corroborate the destination address provided by the primary applicant. The data orchestration system may access information stored on the co-applicant's device. The data orchestration system may attempt to corroborate the destination address based on information stored on the co-applicant device. If the destination address provided by primary applicant cannot be corroborated, the data orchestration system may terminate access of the co-applicant device to the data orchestration system. Corroboration may include gathering information that indicates a threshold likelihood that the address provided by the primary applicant is associated with an intended co-applicant.

As a further example, the second filtering scheme may deny access to the data orchestration system if the co-applicant device or destination address cannot be authenticated.

When applying the second filtering scheme, the data orchestration system may authenticate the co-applicant device. In response to authenticating the co-applicant device, the data orchestration system may apply a third filtering scheme to the co-applicant device. The third filtering scheme may provide access to a second subset of the first set of confidential content received from the primary applicant. The second subset may include more confidential content than the first subset previously accessed by the co-applicant.

The data orchestration system may conduct an interactive chat with the primary applicant and co-applicant. In some embodiments, the primary applicant may communicate with the data orchestration system using a first communication channel. The co-applicant device may communicate with the data orchestration system using a second communication channel.

The first communication channel may be a text based input channel. The second communication may be a voice based input channel. A communication channel may include a combination of different communication channels.

Apparatus may include a data orchestration system. The data orchestration system may filter confidential content. Filtering may include controlling release of instances of confidential content. Filtering may control release of confidential content based on access location, access device, access credentials, authentication method or any suitable access criteria.

Filtering provided by the data orchestration system may control access of confidential content to nodes on a network. Each node may request access to confidential content stored on the data orchestration system.

The data orchestration system may include a master data list of confidential content. The master list may include confidential content received from a node on the network. The master list may include confidential content received from a node pair.

A node pair may be formed by a first node and a second node. The data orchestration system may also include a plurality of exclusive lists. Each exclusive list may list confidential content that is not to be accessed. Excluded confidential content may be instances of confidential content that are restricted from being accessed by a node other than the node that submitted the confidential content. Each member or list included within the plurality of exclusive lists may be associated with a first node and at least one other node that forms a node pair with the first node.

When a node accesses the data orchestration system, the data orchestration system may deploy a filtering scheme. The filtering scheme may be applied by the data orchestration system to a node that accesses the data orchestration system. The filtering scheme may be applied by the data orchestration system to a request received from a node for confidential content.

The data orchestration system may receive, from a second node, a request for confidential content. The second node may request access to confidential content entered by a first node.

The data orchestration system may allow the second node to access at least a subset of confidential content stored in the master list associated with the first node. The data orchestration system may allow the second node to access at least a subset of confidential content in response to identifying at least one exclusive list that is associated with the first node and the second node.

The data orchestration system may deny the second node access to at least a subset of confidential content that corresponds to excluded confidential content listed in an identified exclusive list. The identified exclusive list may be associated with the second node. In some embodiments, a default exclusive list may be associated with all nodes other than the node that submitted the confidential content to the data orchestration system.

A first node and a third node may form a second node pair. A second node may also form a node pair with the first and the third node. The second node pair may not include the second node. The plurality of exclusive lists associated with the first node may include at least one exclusive list associated with the first node and the third node. The plurality of exclusive lists associated with the first node may include at least one exclusive list associated with the first node and the second node.

The exclusive list associated with the first node and the second node may allow the second node access to a first subset of the confidential content stored in the master list associated with the first node. The exclusive list associated with the first node and the third node may allow the third node access to a second subset of the confidential content stored in the master list associated with the first node.

The plurality of exclusive lists may be a first plurality. Each member of the first plurality may be associated with a first node. The data orchestration system may include a second plurality of exclusive lists. Each member of the second plurality may be associated with a second node. Each member of the second plurality may be associated with the second node and at least one other node that forms a node pair with the second node.

The data orchestration system may include a third plurality of exclusive lists. Each member of the third plurality of exclusive lists may be associated with a third node. Each member of the third plurality of exclusive lists may be associated with the third node and at least one other node that forms a node pair with the third node.

Different filtering schemes may be applied in parallel to two or more network nodes. For example, in response to receiving a request for access to the data orchestration system from the second and third nodes, the data orchestration system may apply a second filtering scheme (and associated exclusive list) to the second node. In parallel with applying the second filtering scheme, the data orchestration system may apply a third filtering scheme (and associated exclusive list) to a request for access to the data orchestration system by a third node.

The data orchestration system may provide a first node and a second node asynchronous access to the data orchestration system and/or confidential content stored in a master-list. For example, each of the first and second nodes may independently request access to the data orchestration system. Each of the first and second nodes may request access at different times, using different communication channels and/or using different devices. An ability of the data orchestration system to independently service two or more nodes may improve the workflow and reduce privacy breaches in multi-applicant product application/fulfillment scenarios.

In typical multi-applicant product application scenarios, systems may only allow one applicant to enter data (including confidential content, such as a social security number) at any given time. Typical multi-applicant product application scenarios also did not allow for both applicants to prefill or submit an independently completed application. Typical multi-applicant product application scenarios required sequential input of information which raised a risk of privacy breaches.

The data orchestration system and its associated filtering schemes allow a primary applicant to dynamically add a co-applicant (such as via mobile phone number) to an application/fulfillment workflow. Once added to the workflow, the data orchestration system may accept data (including confidential content) in parallel from the applicant and co-applicant and control access any submitted confidential content. For example, the primary and co-applicant may enter their respective confidential content along with other non-confidential inputs from their own devices after biometric/fingerprint authentication.

The data orchestration system may independently orchestrate and collect data (confidential or generic) required for a joint applicant in parallel from each applicant. The data orchestration system may independently accept, from the primary and co-applicant, consent to submit the final application for the product. For example, the data orchestration system may independently procure consent from multi-applicants by leveraging biometric capabilities of the applicants' personal devices.

The data orchestration system may provide enhanced security of confidential content. Specific instances of confidential content, such as social security numbers or income entered by one applicant may kept hidden, or filtered, from being viewed by a co-applicant. As a further example, consent to finalize an application for a product may be obtained individually (via each applicant's respective personal device) before submitting the application for backend processing.

Furthermore, consent may be obtained using different methods for each applicant. A first applicant may use a first biometric authentication method (e.g., fingerprint scan) to finalize the application. A second applicant may use a finger to input a signature on a touch screen. A third applicant may use a second biometric authentication method (e.g., facial/retina scan) to finalize the application.

Asynchronous and parallel processing of information from multiple applicants may reduce an application abandonment rate. In typical multi-applicant product application scenarios, systems only allowed one applicant to enter data at any given time. While waiting for input from an applicant, the system may time out. After the system times out, an applicant may be required to perform a re-authentication procedure or begin the application process over again. Asynchronous and parallel processing of information from multiple applicants may reduce a number of times the system is waiting for input from one or more applicants.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
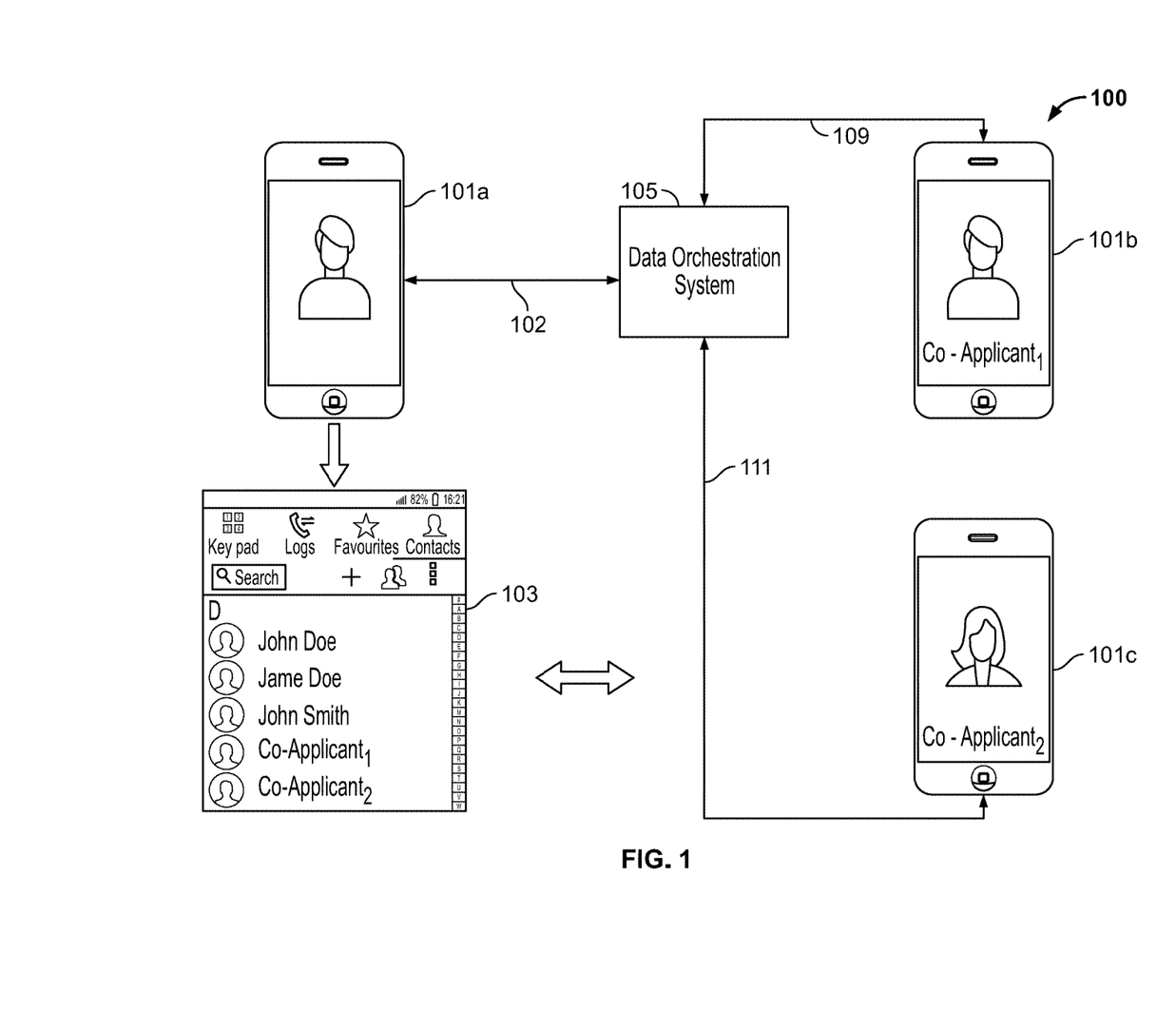
FIG. 1 shows an illustrative system architecture in accordance with principles of the disclosure.

FIG. 1 shows illustrative system architecture 100. Architecture 100 includes applicant 101a. Applicant 101a may be a primary applicant that initiates a request or application for a product. Primary applicant 101a may initiate the request or application via communication with data orchestration system 105 using communication channel 102.

Applicant 101a may identify co-applicant$_1$ 101b and/or co-applicant$_2$ 101c to data orchestration system 105. For example, architecture 100 shows that primary applicant 101a may have stored contact information 103 on a mobile device. Applicant 101a may select one or names stored within contact information 103 and thereby invite co-applicant$_1$ and co-applicant$_2$ to join as applicants. Primary applicant's 101a selections may be transmitted to data orchestration system 105 over communication channel 102.

Based on contact information received from applicant 101a, data orchestration system 105 may initiate communication with co-applicant$_1$ 101b and/or co-applicant$_2$ 101c. Data orchestration system 105 may initiate communication with co-applicants 101b and 101c and simultaneously communicate with primary applicant 101a.

Data orchestration system 105 may accept fingerprints or other biometric authentication methods to pre-fill profile data associated with one or more of applicants 101a, 101b and 101c.

Based on identifying one or more of applicants 101a, 101b and 101c, data orchestration system 105 may prompt an applicant for information that may aid data orchestration system 105 in accessing second-factor authentication.

For example, in some embodiments, data orchestration system 105 may be unable to identify one or more applicants. Primary applicant 101a may invite a new co-applicant that has never applied or used a product or service associated with data orchestration system 105. In such embodiments, data orchestration system 105 may initiate frictionless enrollment of a co-applicant into a secure portal. Data orchestration system 105 may transmit a link to the new co-applicant that allows the new co-applicant to download a mobile application. The mobile application may be securely communicate with data orchestration system 105. Via the mobile application, the new co-applicant may securely submit confidential content to data orchestration system 105.

Data orchestration system 105 may independently and interactively prompt each of the applicants for confidential content. Upon receipt of the confidential content, data orchestration system 105 may independently prompt each of the applicants for final consent to submit the joint application for a product.

Data orchestration system 105 may independently provide each applicant with a decision on whether the joint application for a specific product or service has been approved or denied. Upon approval, data orchestration system 105 may alter a stored profile associated with each of the applicants. For example, if the applicants have jointly applied for a credit card, the data orchestration system 105 may push digital cards to digital wallets associated with each applicant.

Figure 2:
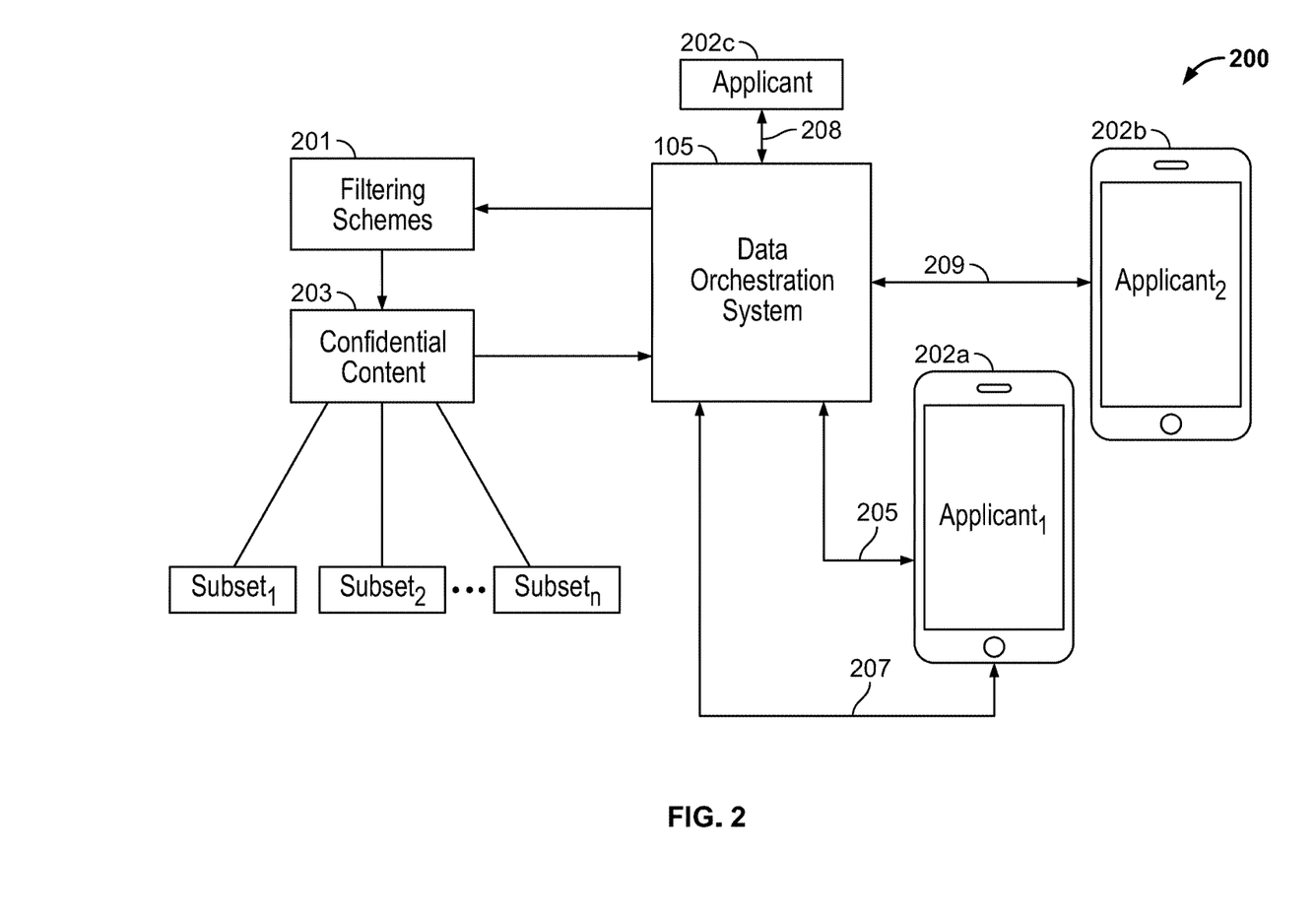
FIG. 2 shows an illustrative system architecture in accordance with principles of the disclosure.

FIG. 2 shows illustrative system architecture 200. Architecture 200 includes data orchestration system 105. Architecture 200 shows that data orchestration system 105 communicates with applicant 202a using communication channels 205 and/or 207. Architecture 200 shows that data orchestration system 105 communicates with applicant 202b using communication channel 209. Architecture 200 shows that data orchestration system 105 may communicate with any suitable number of applicants (e.g., applicant$_N$ 202c) over any suitable number of communication channels (e.g., communication channel 208).

Architecture 200 shows that data orchestration system 105 is associated with filtering schemes 201. Filtering schemes 201 may include computer executable instructions. Architecture 200 shows that filtering schemes 201 may be applied when applicants 202a or 202b access data orchestration system 105. Filtering schemes 201 may control release of confidential content 203 to applicants 202a and 202b. Confidential content 203 may be submitted to data orchestration system 105 by one or more of applicant 202a and/or applicant 202b.

Filtering schemes 201, when executed by a processor on data orchestration system 105, may implement methods for filtering confidential content submitted by one or more of applicant 202a and applicant 202b. For example, architecture 200 shows that filtering schemes 201 may "silo" confidential content 203 into subsets of confidential content. Each applicant may be allowed to access specific subset of confidential content.

For example, when applicant 202a accesses data orchestration system 105, a filtering scheme may be applied that allows applicant 202a to access a subset of confidential content that includes any confidential content submitted by applicant 202a and selected instances of confidential content submitted by applicant 202b.

Figure 3:
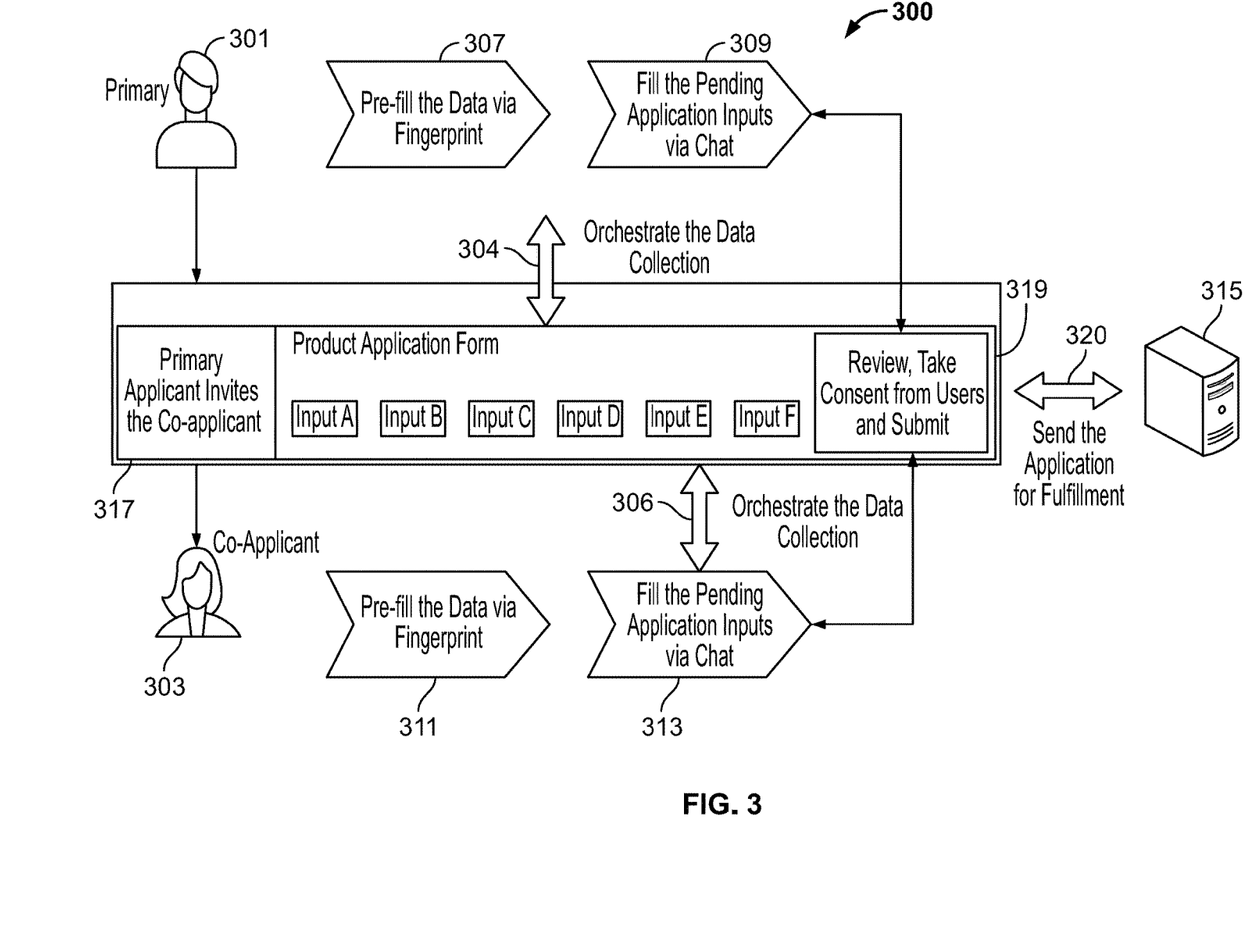
FIG. 3 shows an illustrative system architecture and associated process in accordance with principles of the disclosure.

FIG. 3 shows illustrative process flow 300. For the sake of illustration, one or more of the steps of the process illustrated in FIG. 3 will be described as being performed by a "system." The "system" may include one or more of the features of apparatus (software and/or hardware) or processes described herein and/or any other suitable device or approach. For example, the system may include a data orchestration system. The "system" may be provided by an entity.

At step 301, a primary applicant initiates an application for a product. At step 317 the primary applicant invites co-applicant 303 to join the application process.

Step 307 shows that based on biometric authentication by the primary applicant, the system may pre-fill data. The system may store and access information previously submitted by the primary applicant. The system may access data generated by the primary applicant's interaction with the system. For example, prior to initiating the application process, the primary applicant may have used the system to conduct one or more financial transactions. Specifically, the system may encompass an online banking portal. Based on information associated with the primary applicant's online banking portal profile, the system may pre-fill information needed to complete the primary applicant's application for a new product or service.

Step 309 shows that the system may prompt the primary applicant for additional information using a chat-based communication channel.

Step 311 shows that based on biometric authentication by a co-applicant, the system may pre-fill data. The system may store and access information previously entered by the co-applicant. The system may pre-fill data based on information generated by the co-applicant's prior interaction with the system. Step 313 shows that the system may prompt the co-applicant for additional information using a chat-based communication channel.

Communication steps 304 and 306 show that the system may collect information (including confidential content) from the primary applicant and the co-applicant asynchronously and in parallel.

At step 319, the system reviews application information entered by the primary applicant and the co-applicant. At step 319, the system may also solicit joint consent from the primary applicant and the co-applicant. The consent may be submitted biometrically or using another authentication method that confirms an intent to abide by terms and conditions associated with the jointly applied for service or product.

At step 320, the joint application may be processed by backend system 315 for fulfillment.

Figure 4:
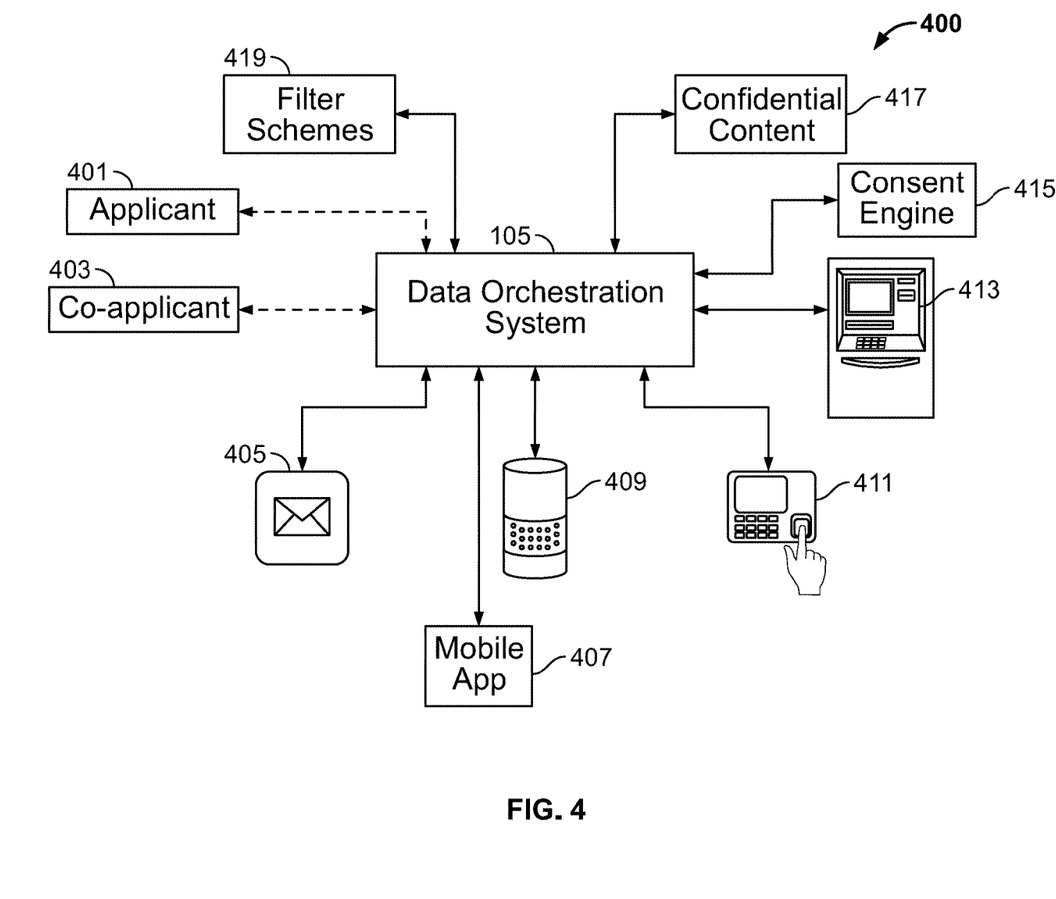
FIG. 4 shows an illustrative system architecture in accordance with principles of the disclosure.

FIG. 4 shows illustrative system architecture 400. Architecture 400 includes data orchestration system 105. Architecture 400 shows that data orchestration system 105 may support text based channel 405. Text based channel 405 may be utilized to dynamically interact with applicant 401 and/or co-applicant 403. Dynamically interaction may include prompting each applicant to submit information based on information received from the other applicant.

Architecture 400 shows that data orchestration system 105 may support communication via mobile application channel 407. A mobile application may be installed on a device associated with applicant 401 and/or co-applicant 403. Applicant 401 and/or co-applicant 403 may utilize the mobile application to securely interact with data orchestration system 105.

Architecture 400 shows that data orchestration system 105 may support communication via voice or chat-bot channel 409. Applicant 401 and/or co-applicant 403 may utilize the chat-bot channel 409 to interact with or submit information to data orchestration system 105.

Architecture 400 shows that data orchestration system 105 may support communication via automated teller machine ("ATM") channel 413. Applicant 401 and/or co-applicant 403 may utilize the ATM channel 413 to interact with or submit information to data orchestration system 105.

Applicant 401 and/or co-applicant 403 may utilize one or more of communication channels 405, 407, 409 and/or 413 to communicate with data orchestration system 105. For example, applicant 401 may initiate an application process using mobile application channel 407, enter confidential content 417 using chat-bot channel 409 and provide consent using ATM channel 413.

Architecture 400 shows that data orchestration system 105 may support communication with biometric scanner 411. Biometric scanner 411 may be used to authenticate an applicant using a communication channel. Data orchestration system 105 may require authentication at any stage of an application process. Illustrative stages may include initiation of an application for a product, inviting a co-applicant to join the application process, submission of confidential content, access to confidential content and/or submission of consent to process a completed joint application.

Biometric scanner 411 may be a standalone device. Biometric scanner 411 may be embedded in another device such as a smartphone, chat-bot (such as chat-bot 409) or an ATM (such as ATM 413).

Architecture 400 shows that data orchestration system 105 may include filtering schemes 419. Filtering schemes 419 may control access to data orchestration system 105 and/or confidential content 417.

Architecture 400 shows that data orchestration system 105 may include consent engine 415. Consent engine 415 may process consents received from applicant 401 and/or co-applicant 403. Consent engine 415 may determine whether, after completion of a joint application process, sufficient authentication has already been received from an applicant. For example, data orchestration system 105 may request biometric authentication at different stages of the application process. Data orchestration system 105 may corroborate information received from an applicant. The previous received authentication and/or corroboration may itself form consent to proceed with the joint application.

Figure 5:
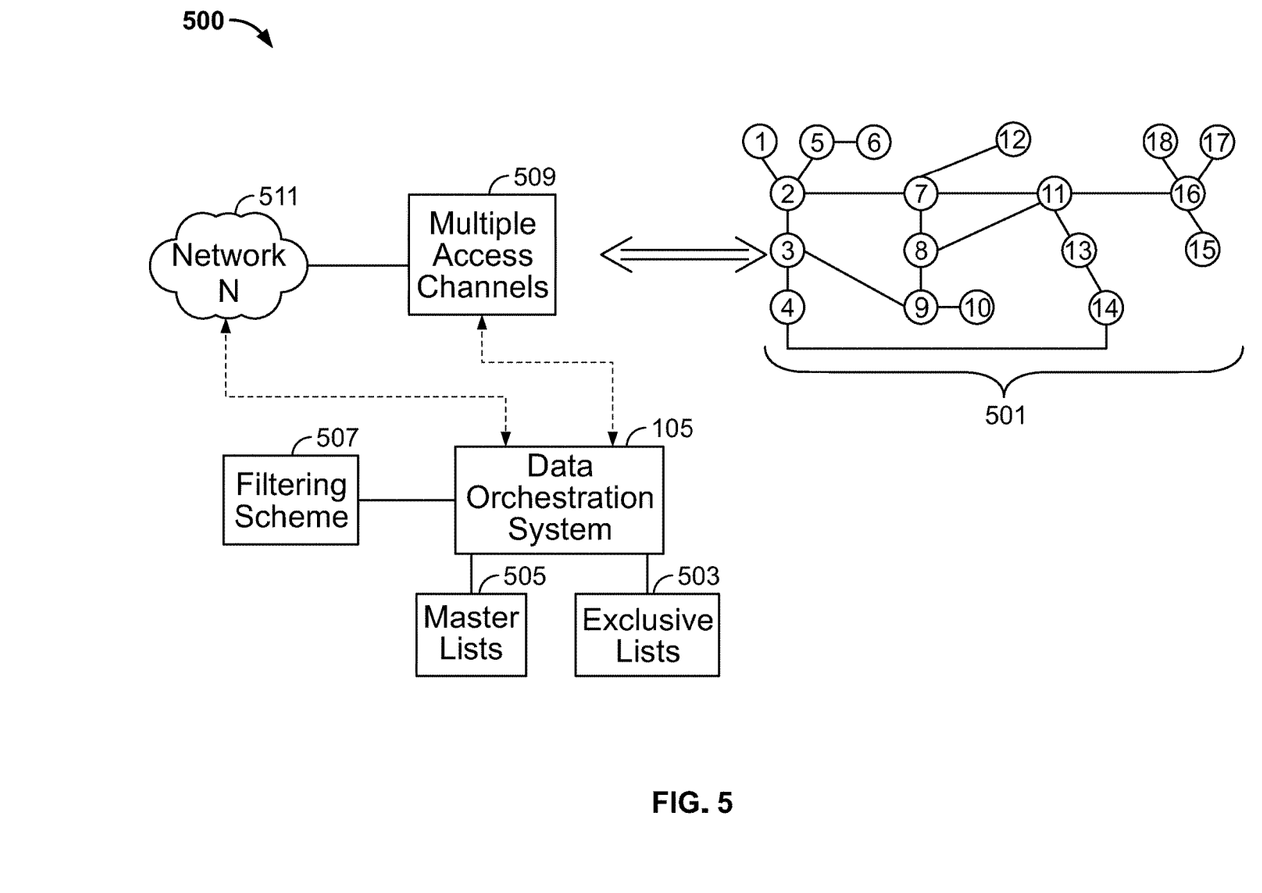
FIG. 5 shows an illustrative system architecture in accordance with principles of the disclosure.

FIG. 5 shows illustrative system architecture 500. Architecture 500 shows that data orchestration system 105 may support communication across multiple communication channels 509. Multiple communication channels 509 may utilize network 511 to access data orchestration system 105. Network 511 may include the internet, private networks and/or any combination of networks. Illustrative access channels may include chat-bot 409 (shown above in FIG. 4), ATM 413 (shown above in FIG. 4) and text message 405 (shown above in FIG. 4).

FIG. 5 shows illustrative network nodes 1-15. Each of nodes 1-15 may access data orchestration system 105 via one or more of multiple communication channels 509. Each of nodes nos. 1-15 may be associated with a master list 505. Master list 505 may include all confidential content associated with a node.

Each node may also be associated with one or more exclusive lists 503. Each exclusive list may designate one or more instances of confidential content, that when requested by a node, is withheld by filtering scheme 507.

Figure 6:
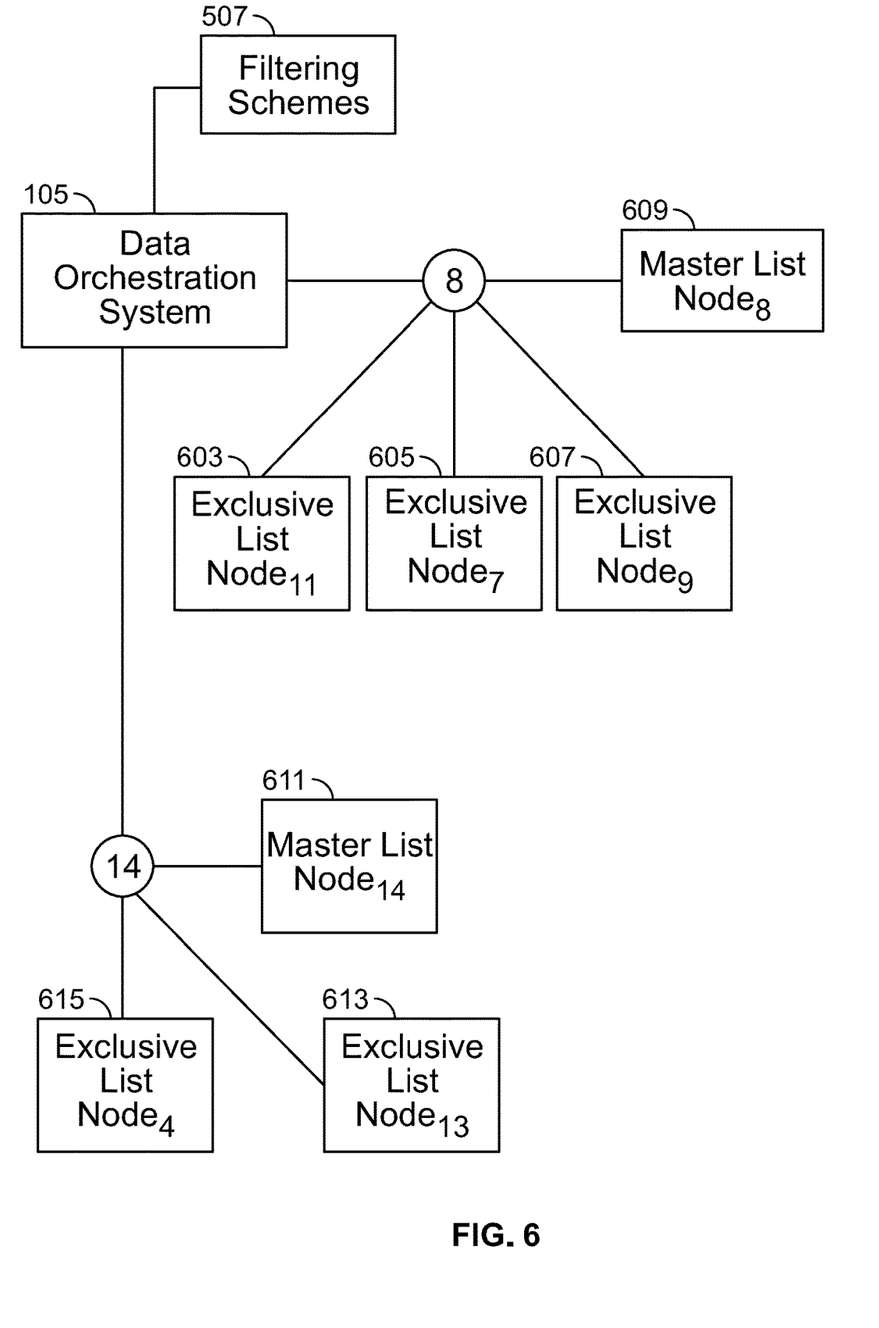
FIG. 6 shows detail associated with the illustrative system architecture shown in FIG. 5.

FIG. 6 shows additional detail associated with nodes nos. 8 and 14 (shown above in FIG. 5).

FIG. 5 shows that node 8 forms three node-pairs. Node 8 forms a first node pair with node 11. Node 8 forms a second node pair with node 7. Node 8 forms a third node pair with node 9.

FIG. 6 shows that node 8 is associated with master list 609. Master list 609 may include all confidential content associated with node 8. FIG. 6 also shows that node 8 is associated with exclusive list 603 (node 11), exclusive list 605 (node 7) and exclusive list 607 (node 9). Each exclusive list may indicate instances of confidential content included in master list 609 (node 8) that is withheld from a corresponding node (e.g., one or more of nodes 11, 7 or 9).

For example, when node 11 accesses data orchestration system 105, data orchestration system 105 may deploy a filtering scheme 507. Filtering scheme 507 may control access of confidential content (master list 609) for node 8. For node 11, filtering scheme 507 may withhold instances of confidential content listed in exclusive list 603.

The instances of confidential content withheld by exclusive list 603 may be different than the instances of confidential content withheld by exclusive lists 605 or 607.

FIG. 6 also shows that node 14 is associated with master list 611. FIG. 5 shows that node 14 forms two node pairs. Node 14 forms a first node pair with node 4. Node 14 forms a second node pair with node 13.

FIG. 6 shows that node 14 is associated with master list 611. Master list 611 may include all confidential content associated with node 14. FIG. 6 also shows that node is associated with exclusive lists 315 (node 4) and 613 (node 13). Each exclusive list may list instances of confidential content included in master list 611 that is to be withheld from node 4 or node 13. Each node may be associated with different exclusive list for each node pair of which it is member.

Thus, methods and apparatus for secure multiple-party communication and data orchestration have been provided. Persons skilled in the art will appreciate that the present invention can be practiced by other than the described embodiments, which are presented for purposes of illustration rather than of limitation. The present invention is limited only by the claims that follow.

What is claimed is:

1. A method of providing asynchronous and restricted access to confidential content transmitted from a secure storage location to an applicant device that accesses the confidential content over an unsecure computer network, the method comprising:
    using a first applicant device, initiating a secure connection to a data orchestration system;
    after establishing the secure connection, using the first applicant device, receiving and transmitting a first set of confidential content to the data orchestration system wherein, the first set of confidential content includes a destination address of a second applicant device;
    based on the first set of confidential content received from the first applicant device, generating a first filtering scheme for the first applicant device and a second filtering scheme for the second applicant device;
    using the data orchestration system, initiating unsecure communication over the unsecure network with the second applicant device at the destination address provided by the first applicant device;
    coordinating secure and asynchronous access via the second applicant device to the data orchestration system;
    based on coordinating secure and asynchronous access to the data orchestration system, receiving a second set of confidential content from the second applicant device;
    deploying a third filtering scheme to coordinate asynchronous access, via the first applicant device, to a third set of confidential content that includes the first set of confidential content and a subset of the second set of confidential content; and
    deploying a fourth filtering scheme to coordinate secure asynchronous access, via the second applicant device, to a fourth set of confidential content that includes the second set of confidential content and a subset of the first set of confidential content;
    wherein:
    the first applicant device is associated with a primary applicant;
    the second applicant device is associated with a co-applicant; and
    the primary applicant is not the co-applicant.

2. The method of claim 1, the method further comprising:
    authenticating the second applicant device during communication with the data orchestration system using the second filtering scheme; and
    using the fourth filtering scheme, the data orchestration system asynchronously securely communicates with the second applicant device.

3. The method of claim 1 wherein application of the third filtering scheme provides the first applicant device:
    access to all information associated with the first set of confidential content; and
    access to the subset of the second set of confidential content in parallel with the second applicant device.

4. The method of claim 1 wherein application of the fourth filtering scheme provides the second applicant device:
    access to all information associated with the second set of confidential content; and
    access to the subset of the first set of confidential content in parallel with the first applicant device.

5. The method of claim 1 further comprising creating the fourth filtering scheme based on receiving authenticating biometric information from the second applicant device.

6. The method of claim 1 further comprising:
using a first communication channel for secure and asynchronous communication between the data orchestration system and the first applicant device; and
using a second communication channel for secure and asynchronous communication between the data orchestration system and the second applicant device.

7. The method of claim 6 wherein the first communication channel is selected from among the group consisting of:
an interactive voice channel;
a text-based channel; and
a video chat channel.

8. A system architecture for providing asynchronous and restricted access to confidential content transmitted from a secure storage location to an applicant device that requests the confidential content over an unsecure computer network, the system architecture comprising:
a data orchestration system;
a first applicant device that initiates a secure connection to the data orchestration system; and
a second applicant device that is invited to access the data orchestration system by the first applicant device;
wherein, in operation:
after establishing the secure connection, the first applicant device receives and transmits a first set of confidential content to the data orchestration system and the first set of confidential content includes a destination address of the second applicant device;
based on the first set of confidential content received from the first applicant device, the data orchestration system associates a first filtering scheme with the first applicant device, the first filtering scheme, when applied to the first applicant device by the data orchestration system, coordinates asynchronous access to the first set of confidential content;
the data orchestration system initiates an unsecure communication over the unsecure network with the second applicant device, the unsecure communication comprising transmitting to the second device computer executable instructions for initiating a secure connection from the second device to the data orchestration system;
in response to receiving a request, from the second applicant device to initiate the secure connection, the data orchestration system applies a second filtering scheme to the second applicant device, the second filtering scheme, when applied to the second applicant device by the data orchestration system, accepts a second set of confidential content from the second applicant device and coordinates asynchronous access to the second set of confidential content; and
based on applying the first and second filtering schemes, the data orchestration system receives the first and second sets of confidential content in parallel from each of the first applicant and second applicant devices;
wherein:
the first applicant device is associated with a primary applicant;
the second applicant device is associated with a co-applicant; and
the primary applicant is not the co-applicant.

9. The system architecture of claim 8 wherein receiving confidential information in parallel via asynchronous access prevents the data orchestration system from timing out while communicating with the first applicant and second applicant devices.

10. The system architecture of claim 8 wherein the second filtering scheme filters the first set of confidential content received from the first applicant device and provides the second applicant device asynchronous access to a subset of the first set of confidential content.

11. The system architecture of claim 8 wherein the first filtering scheme filters the second set of confidential content received from the second applicant device and provides the first applicant device asynchronous access to a subset of the second set of confidential content.

12. The system architecture of claim 8, wherein the second filtering scheme denies the second applicant device access to the first set of confidential content received from the first applicant device.

13. The system architecture of claim 8, wherein:
the first applicant device communicates with the data orchestration system using a first communication channel; and
the second applicant device communicates with the data orchestration system using a second communication channel.

14. The system architecture of claim 13 wherein:
the first communication channel is a text based input channel; and
the second communication is a voice based input channel.

15. The system architecture of claim 10, wherein the subset of the confidential content received from the first applicant device is a first subset:
the data orchestration system, when applying the second filtering scheme, authenticates the second applicant device; and
in response to authenticating the second applicant device, the data orchestration system applies a third filtering scheme to the second applicant device, the third filtering scheme provides access to a second subset of the confidential content received from the first applicant device;
wherein the second subset comprises more confidential content than the first subset.

16. The system architecture of claim 8, wherein the second filtering scheme terminates access of the second applicant device to the data orchestration system when the destination address provided by the first applicant device does not match corresponding data stored on the second applicant device.

* * * * *